US011789896B2

(12) United States Patent
Hua

(10) Patent No.: US 11,789,896 B2
(45) Date of Patent: Oct. 17, 2023

(54) PROCESSOR FOR CONFIGURABLE PARALLEL COMPUTATIONS

(71) Applicant: STAR ALLY INTERNATIONAL LIMITED, Tortola (VG)

(72) Inventor: Wensheng Hua, Fremont, CA (US)

(73) Assignee: STAR ALLY INTERNATIONAL LIMITED, Tortola, VI (US)

( * ) Notice: Subject to any disclaimer, the term of this patent is extended or adjusted under 35 U.S.C. 154(b) by 33 days.

(21) Appl. No.: 17/132,437

(22) Filed: Dec. 23, 2020

(65) Prior Publication Data

US 2021/0200710 A1 Jul. 1, 2021

Related U.S. Application Data

(60) Provisional application No. 62/954,952, filed on Dec. 30, 2019.

(51) Int. Cl.
*G06F 15/78* (2006.01)
*G06F 13/12* (2006.01)

(52) U.S. Cl.
CPC ........ *G06F 15/7871* (2013.01); *G06F 13/124* (2013.01)

(58) Field of Classification Search
CPC ..... H04L 47/2441; H04L 69/12; H04L 69/22; H04L 45/06; H04L 45/26; H04L 45/40; G06F 15/17368; G06F 8/65; G06F 13/364; G06F 13/385; G06F 13/4004; G06F 15/17381; G06F 15/8015; G06F 15/7871; G06F 13/124; G06F 13/4022; G06F 15/7867; Y02D 10/00

USPC ........ 709/224, 243, 250, 223; 710/316, 110, 710/119; 712/225
See application file for complete search history.

(56) References Cited

U.S. PATENT DOCUMENTS

| | | | | |
|---|---|---|---|---|
| 5,056,000 A | * | 10/1991 | Chang | G06F 15/17375 710/110 |
| 5,594,866 A | * | 1/1997 | Nugent | G06F 15/17368 370/517 |
| 5,680,400 A | * | 10/1997 | York | H04J 3/247 370/473 |
| 6,363,453 B1 | * | 3/2002 | Esposito | G06F 11/20 711/2 |
| 7,159,099 B2 | * | 1/2007 | Lucas | G06F 9/345 712/E9.046 |
| 7,600,143 B1 | | 10/2009 | Neuman | |
| 7,840,777 B2 | * | 11/2010 | Mykland | G06F 15/7867 712/15 |

(Continued)

OTHER PUBLICATIONS

"PCT Search Report and Written Opinion, PCT/US2020/66823", dated Mar. 15, 2021, 16 pages.

*Primary Examiner* — Faisal M Zaman
(74) *Attorney, Agent, or Firm* — Edward C. Kwok; VLP Law Group LLP

(57) ABSTRACT

A flexible processor includes (i) numerous configurable processors interconnected by modular interconnection fabric circuits that are configurable to partition the configurable processors into one or more groups, for parallel execution, and to interconnect the configurable processors in any order for pipelined operations, Each configurable processor may include (i) a control circuit; (ii) numerous configurable arithmetic logic circuits; and (iii) configurable interconnection fabric circuits for interconnecting the configurable arithmetic logic circuits.

24 Claims, 4 Drawing Sheets

(56) References Cited

U.S. PATENT DOCUMENTS

| | | | |
|---|---|---|---|
| 7,958,341 B1* | 6/2011 | Cismas | G06F 15/17381 |
| | | | 712/225 |
| 7,982,497 B1 | 7/2011 | Trimberger | |
| 8,886,899 B1* | 11/2014 | Bao | G06F 12/0891 |
| | | | 710/316 |
| 9,712,442 B2* | 7/2017 | Wu | H04L 45/742 |
| 9,985,996 B2* | 5/2018 | Mamidwar | H04L 65/1023 |
| 10,404,624 B2* | 9/2019 | Kostic | H04L 49/505 |
| 10,824,467 B2* | 11/2020 | Underwood | G06F 9/5027 |
| 10,929,405 B2* | 2/2021 | Walker | G06F 13/128 |
| 2001/0024456 A1* | 9/2001 | Zaun | H04N 7/52 |
| | | | 375/E7.267 |
| 2002/0015401 A1* | 2/2002 | Subramanian | H04L 27/0008 |
| | | | 370/332 |
| 2003/0039262 A1 | 2/2003 | Wong et al. | |
| 2004/0098562 A1 | 5/2004 | Anderson et al. | |
| 2004/0225790 A1 | 11/2004 | George et al. | |
| 2007/0113229 A1* | 5/2007 | Serghi | G06F 15/8007 |
| | | | 718/100 |
| 2007/0186082 A1* | 8/2007 | Prokopenko | G06F 9/3885 |
| | | | 712/221 |
| 2008/0117965 A1* | 5/2008 | Vysotsky | H04L 65/1083 |
| | | | 375/240.01 |
| 2008/0126746 A1* | 5/2008 | Hyduke | G06F 21/552 |
| | | | 712/17 |
| 2008/0133899 A1 | 6/2008 | Park et al. | |
| 2009/0049275 A1* | 2/2009 | Kyo | G06F 15/80 |
| | | | 712/20 |
| 2009/0144527 A1* | 6/2009 | Nakata | H04L 49/901 |
| | | | 712/221 |
| 2009/0179794 A1 | 7/2009 | Dooley et al. | |
| 2011/0051670 A1 | 3/2011 | Safarian et al. | |
| 2011/0231616 A1* | 9/2011 | Lin | G06F 9/30134 |
| | | | 711/147 |
| 2011/0314233 A1 | 12/2011 | Yan et al. | |
| 2012/0191967 A1 | 7/2012 | Lin et al. | |
| 2012/0233616 A1* | 9/2012 | Moy | G06F 9/4881 |
| | | | 718/100 |
| 2013/0060993 A1* | 3/2013 | Park | G06F 16/9535 |
| | | | 711/149 |
| 2014/0351551 A1* | 11/2014 | Doerr | G06F 9/3005 |
| | | | 711/204 |
| 2018/0357064 A1* | 12/2018 | Chen | G06F 12/0891 |

* cited by examiner

PROCESSOR FOR CONFIGURABLE PARALLEL COMPUTATIONS

CROSS REFERENCE TO RELATED APPLICATIONS

The present application is related to and claims priority of U.S. provisional application ("Provisional application"), Ser. No. 62/954,952, entitled "Processor For Configurable Parallel Computations," filed on Dec. 30, 2019. The disclosure of the Provisional Application is hereby incorporated by reference herein in its entirety.

BACKGROUND OF THE INVENTION

1. Field of the Invention

The present invention relates to processor architecture. In particular, the present invention relates to architecture of a processor having numerous processing units and data paths that are configurable and reconfigurable to allow parallel computing and data forwarding operations to be carried out in the processing units.

2. Discussion of the Related Art

Many applications (e.g., signal processing, navigation, matrix inversion, machine learning, large data set searches) require enormous amount of repetitive computation steps that are best carried out by numerous processors operating in parallel. Current microprocessors, whether the conventional "central processing units" (CPUs) that power desktop or mobile computers, or the more numerically-oriented conventional "graphics processing units" (GPUs), are suited for such tasks. A CPU or GPU, even if provided numerous cores, are inflexible in their hardware configurations. For example, signal processing applications often require sets of large number of repetitive floating-point arithmetic operations (e.g., add and multiply). As implemented in a conventional CPU or GPU, the operations of a single neuron may be implemented as a series of add, multiply and compare instructions, with each instruction being required to fetch operands from registers or memory, perform the operation in an arithmetic-logic unit (ALU), and write back the result or results of the operations back to registers or memory, Although the nature of such operations are well-known, the set of instructions, or the execution sequence of instructions, may vary with data or the application. Thus, because of the manner in which memory, register files and ALUs are organized in a conventional CPU or GPU, it is difficult to achieve a high-degree of parallel processing and streamlining of data flow without the flexibility of reconfiguring the data paths that shuttle operands between memory, register files and ALUs. In many applications, as these operations may be repeated hundreds of millions of times, enormous efficiencies can be attained in a processor with an appropriate architecture.

SUMMARY

According to one embodiment of the present invention, a processor includes (i) a plurality of configurable processors interconnected by modular interconnection fabric circuits that are configurable to partition the configurable processors into one or more groups, for parallel execution, and to interconnect the configurable processors in any order for pipelined operations, According to one embodiment, each configurable processor may include (i) a control circuit; (ii) a plurality of configurable arithmetic logic circuits; and (iii) configurable interconnection fabric circuits for interconnecting the configurable arithmetic logic circuits.

According to one embodiment of the present invention, each configurable arithmetic logic circuits may include (i) a plurality of arithmetic or logic operator circuits; and (ii) a configurable interconnection fabric circuit.

According to one embodiment of the present invention, each configurable interconnection fabric circuit may include (i) a Benes network and (ii) a plurality of configurable first-in-first-out (FIFO) registers.

The present invention is better understood upon consideration of the detailed description below with the accompanying drawings.

BRIEF DESCRIPTION OF THE DRAWINGS

To facilitate cross-referencing between figures, like elements in the figures are provided like reference numerals.

DETAILED DESCRIPTION OF THE PREFERRED EMBODIMENTS

Figure 1:
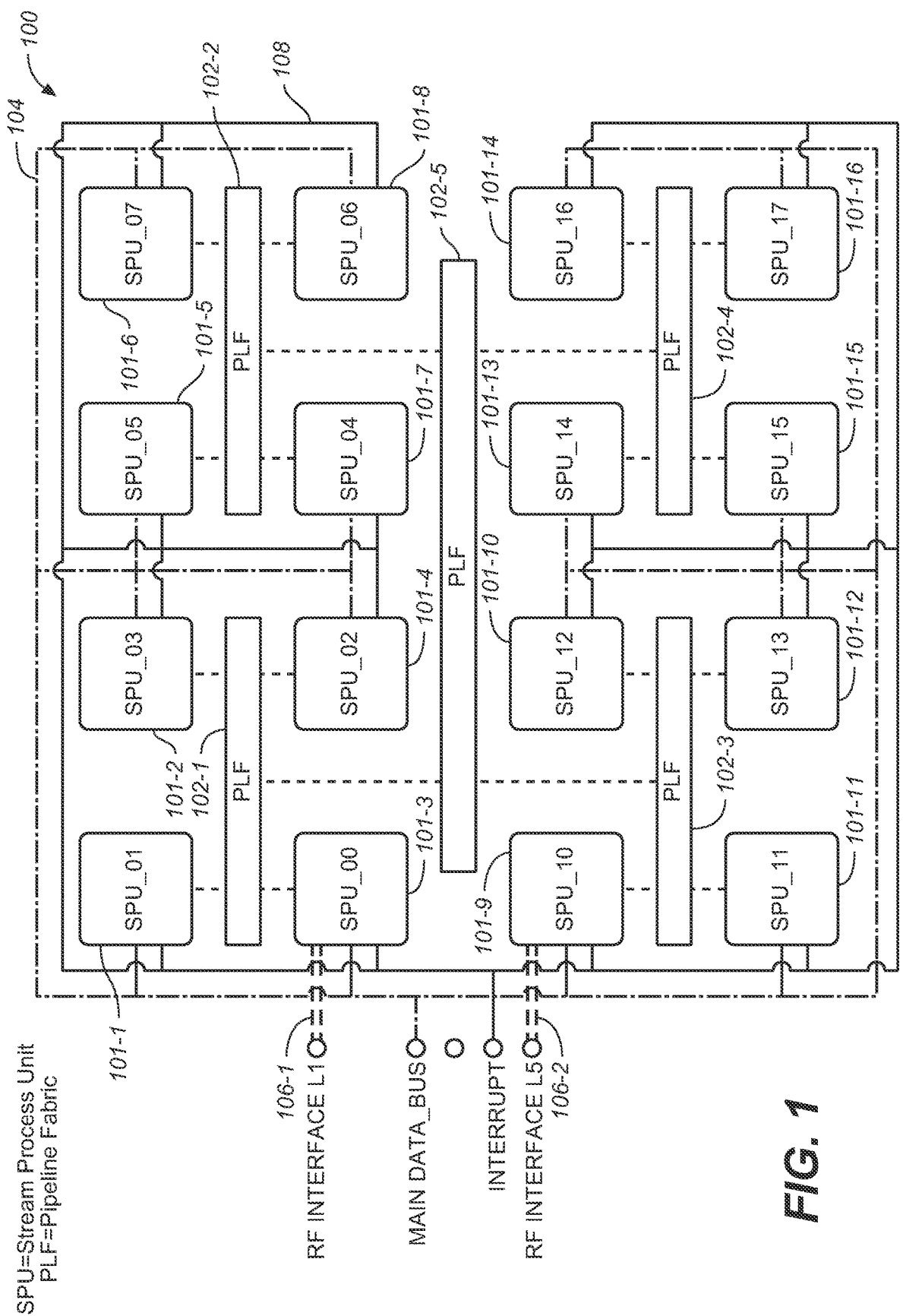
FIG. 1 shows processor 100 that includes 4×4 array of stream processing units (SPU) 101-1, 101-2, 101-3, . . . , and 101-16, according to one embodiment of the present invention.

FIG. 1 shows a processor 100 that includes, for example, 4×4 array of stream processing units (SPU) 101-1, 101-2, 101-3, . . . , and 101-16, according to one embodiment of the present invention. Of course, the 4×4 array is selected for illustrative purpose in this detailed description. A practical implementation may have any number of SPUs. The SPUs are interconnected among themselves by configurable pipeline fabric (PLF) 102 that allow computational results from a given SPU to be provided or "streamed" to another SPU. With this arrangement, the 4×4 array of SPUs in processor 100 may be configured at run time into one or more groups of SPUs, with each group of SPUs configured as pipeline stages for a pipelined computational task.

In the embodiment shown in FIG. 1, PLF 102 is shown to include PLF unit 102-1, 102-2, 102-3 and 102-4, each may be configured to provide data paths among the four SPUs in one of four quadrants of the 4×4 array. PLF units 102-1, 102-2, 102-3 and 102-4 may also be interconnected by suitably configuring PLF unit 102-5, thereby allowing computational results from any of SPUs 101-1, 101-2, 101-3, . . . , and 101-16 to be forwarded to any other one of SPUs 101-1, 101-2, 101-3, . . . , and 101-16. In one embodiment, the PLF units of processor 100 may be organized in a hierarchical manner (The organization shown in FIG. 1 may be considered a 2-level hierarchy with PLF 102-1, 102-2, 102-3 and 102-4 forming one level and PLF 102-5 being a second level.) In this embodiment, a host CPU (not shown) configures and reconfigures processor 100 over global bus 104 in real time during an operation. Interrupt bus 105 is provided to allow each SPU to raise an interrupt to the host CPU to indicate task completion or any of numerous exceptional conditions. Input data buses 106-1 and 106-2 stream input data into processor 100.

In one satellite positioning application, processor 100 may serve as a digital baseband circuit that processes in real time digitized samples from a radio frequency (RF) front-end circuit. In that application, the input data samples received into processor 100 at input data buses 106-1 and 106-2 are in-phase and quadrature components of a signal received at an antenna, after signal processing at the RF front-end circuit. The received signal includes the navigation signals transmitted from numerous positioning satellites.

Figure 2:
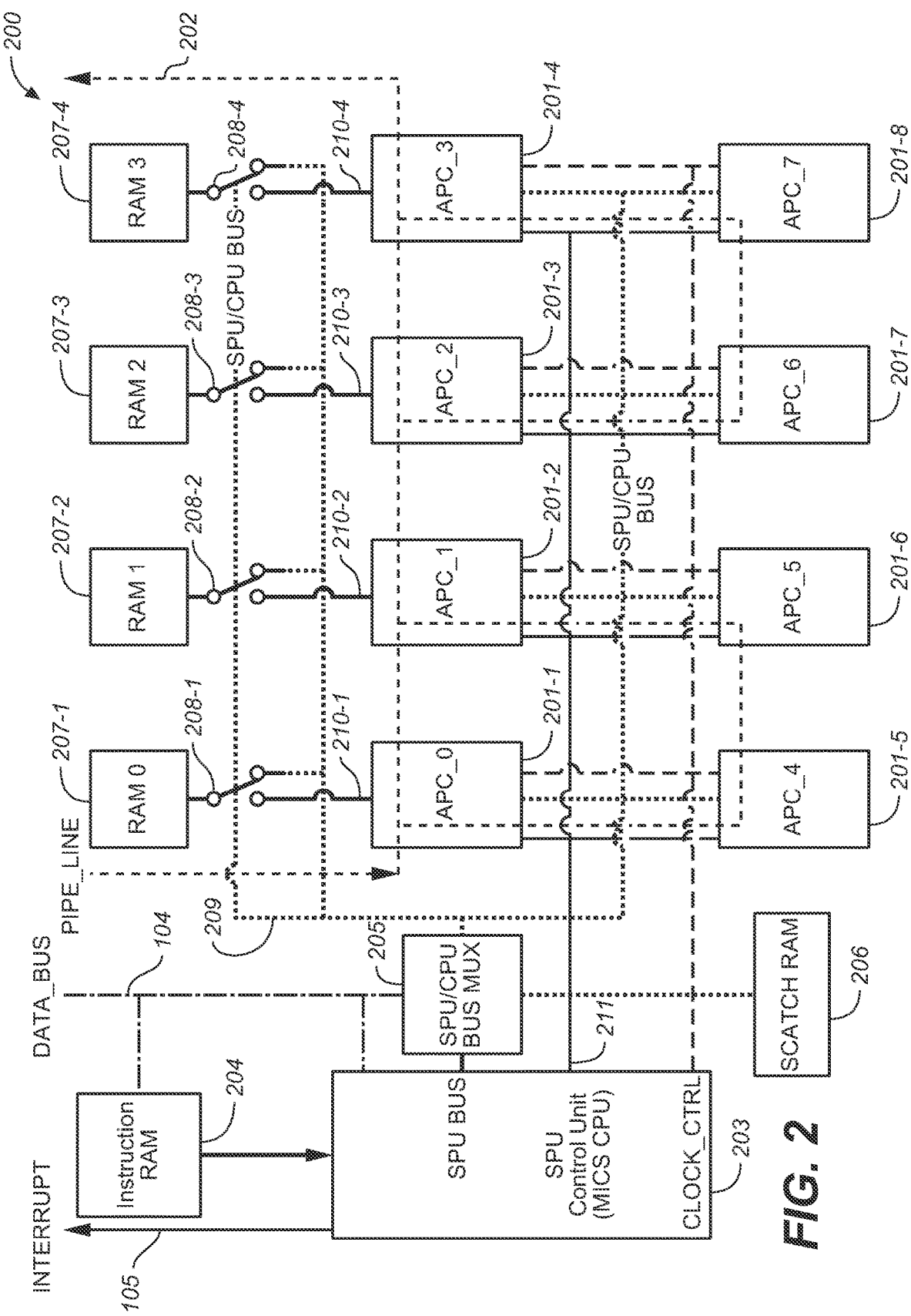
FIG. 2 shows SPU 200 in one implementation of an SPU in processor 100 of FIG. 1, according to one embodiment of the present invention.

FIG. 2 shows SPU 200 in one implementation of an SPU in processor 100, according to one embodiment of the present invention. As shown in FIG. 2, SPU 200 includes 2×4 array of arithmetic and logic units, each referred herein as an "arithmetic pipeline complex" (APC) to highlight that (i) each APC is reconfigurable via a set of configuration registers for any of numerous arithmetic and logic operations; and (ii) the APCs may be configurable in any of numerous manners to stream results any APC to another APC in SPU 200. As shown in FIG. 2, APCs 201-1, 201-2, . . . , 201-8 in the 2×4 array of APCs in SPU 200 are provided data paths among themselves on PLF subunit 202, which is an extension from its corresponding PLF unit 101-1, 101-2, 101-3 or 101-4.

As shown in FIG. 2, SPU 200 includes control unit 203, which executes a small set of instructions from instruction memory 204, which is loaded by host CPU over global bus 104. Internal processor bus 209 is accessible by host CPU over global bus 104, during a configuration phase, and by control unit 203 during a computation phase. Switching between the configuration and computational phases is achieved by an enable signal asserted from the host CPU. When the enable signal is de-asserted, any clock signal to an APC—and, hence, any data valid signal to any operator with the APC . . . is gated off to save power. Any SPU may be disabled by the host. CPU by gating off the power supply signals to the SPL In some embodiments, power supply signals to an APC may also be gated. Likewise, any PLF may also be gated off, when appropriate, to save power.

The enable signal to an APC may be memory-mapped to allow it to be accessed over internal process bus 209. Through this arrangement, when multiple APCs are configured in a pipeline, the host. CPU or SPU 200, as appropriate, may control enabling the APCs in the proper order—e.g., enabling the APCs in the reverse order of the data flow in the pipeline, such that all the APCs are ready for data processing when the first APC in the data flow is enabled.

Multiplexer 205 switches control of internal processor bus 209 between the host CPU and control unit 203. SPU 200 includes memory blocks 207-1, 207-2, 207-3 and 207-4, which are accessible over internal processor bus 209 by the host CPU or SPU 200, and by APC 201-1, 201-2, . . . , 201-8 over internal data bus during the computation phase. Switches 208-1, 208-2, 208-3 and 208-4 each switch access to memory blocks 207-1, 207-2, 207-3 and 207-4 between internal processor bus 209 and a corresponding one of internal data bus 210-1, 210-2, 210-3 and 210-4. During the configuration phase, the host CPU may configure any element in SPU 200 by writing into configuration registers over global bus 104, which is extended into internal processor bus 209 by multiplexer 205 at this time. During the computation phase, control unit 203 may control operation of SPU 200 over internal processor bus 209, including one or more clock signals that that allow APCs 201-1, 201-2, . . . , 201-8 to operate synchronously with each other. At appropriate times, one or more of APCs 201-1, 201-2, . . . , 201-8 may raise an interrupt on interrupt bus 211, which is received into SPU 200 for service. SPU may forward the interrupt signals and its own interrupt signals to the host CPU over interrupt bus 105. Scratch memory 206 is provided to support instruction execution in control unit 203, such as for storing intermediate results, flags and interrupts. Switching between the configuration phase and the computation phase is controlled by the host CPU.

In one embodiment, memory blocks 207-1, 207-2, 207-3 and 207-4 are accessed by control unit 203 using a local address space, which may be mapped into an allocated pan of a global address space of processor 100. Configuration registers of APCs 201-1, 201-2, . . . , 201-8 are also likewise accessible from both the local address space and the global address space. APCs 201-1, 201-2, . . . , 201-8 and memory blocks 207-1, 207-2, 207-3 and 207-4 may also be directly accessed by the host CPU over global bus 104. Setting multiplexer 205 through a memory-mapped register, the host CPU can connect and allocate internal processor bus 209 to become part of global bus 104.

Control unit 203 may be a microprocessor of a type referred to by those of ordinary skill in the art as a minimal instruction set computer (MISC) processor, which operates under supervision of the host CPU. In one embodiment, control unit 203 manages lower level resources (e.g., APC 201-1, 201-2, 201-3 and 201-4) by servicing certain interrupts and by configuring locally configuration registers in the resources, thereby reducing the supervisory requirements of these resources on the host CPU. In one embodiment, the resources may operate without participation by control unit 203, i.e., the host CPU may directly service the interrupts and the configuration registers. Furthermore, when a configured data processing pipeline requires participation by multiple SPUs, the host CPU may control the entire data processing pipeline directly.

Figure 3A:
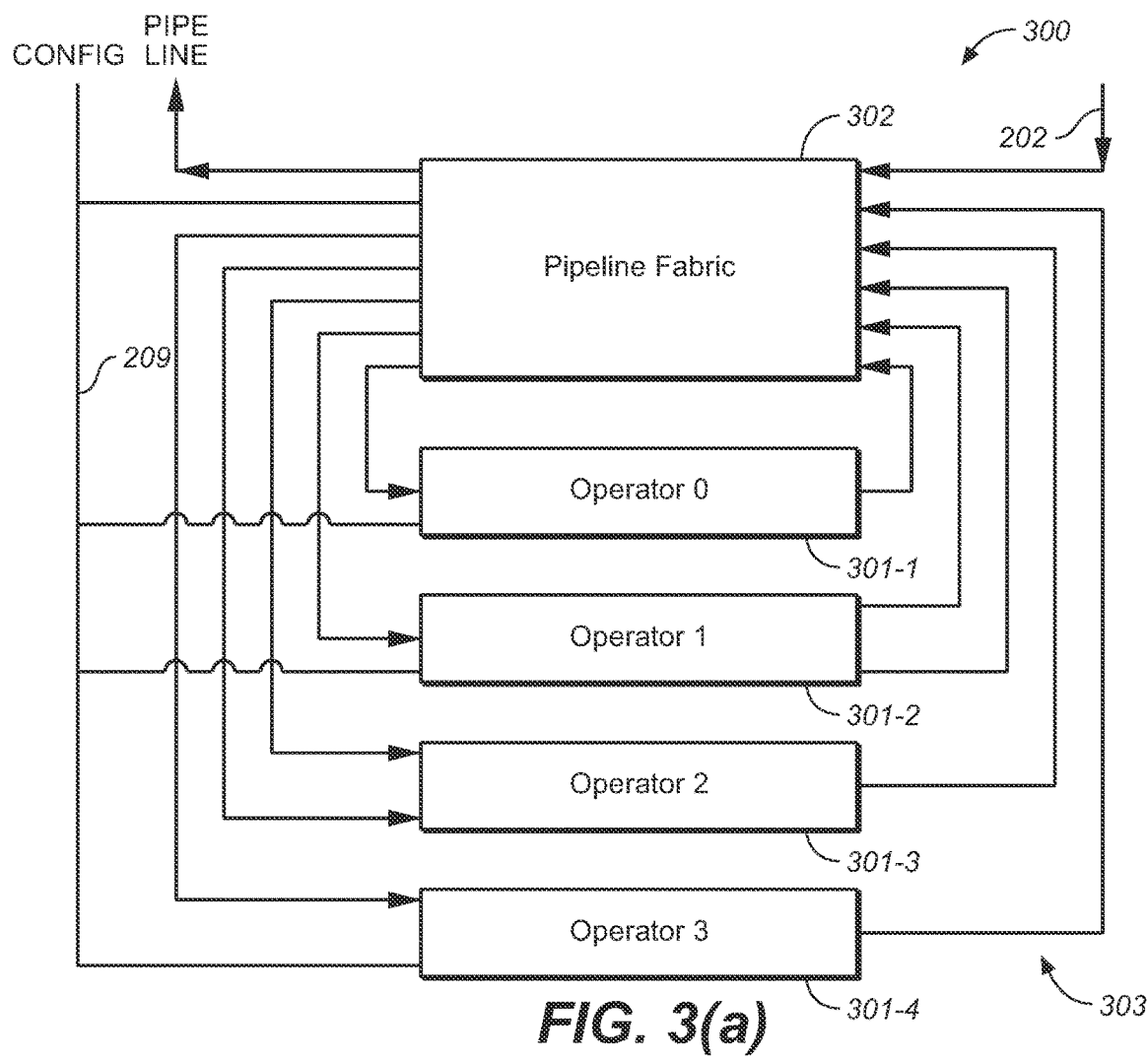
FIG. 3(a) shows APC 300 in one implementation of one of APC 201-1, 201-2, 201-3 and 201-4 of FIG. 2, according to one embodiment of the present invention.

FIG. 3(a) shows APC 300 in one implementation of one of APC 201-1, 201-2, 201-3 and 201-4 of FIG. 2, according to one embodiment of the present invention. As shown in FIG. 3(a), for illustrative purpose only, APC 300 includes representative operator units 301-1, 301-2, 301-3, and 301-4. Each operator unit may include one or more arithmetic or logic circuits (e.g., adders, multipliers, shifters, suitable combinational logic circuit, suitable sequential logic circuits, or combinations thereof). APC PLF 302 allows creation of data paths 303 among the operators in any suitable manner by the host CPU over internal processor bus 209. APC PLF 302 and operators 301-1, 301-2, 301-3 and 301-4 are each configurable over internal processor bus 209 by both the host CPU and control unit 203, such that the operators may be organized to operate on the data stream in a pipeline fashion.

Figure 3B:
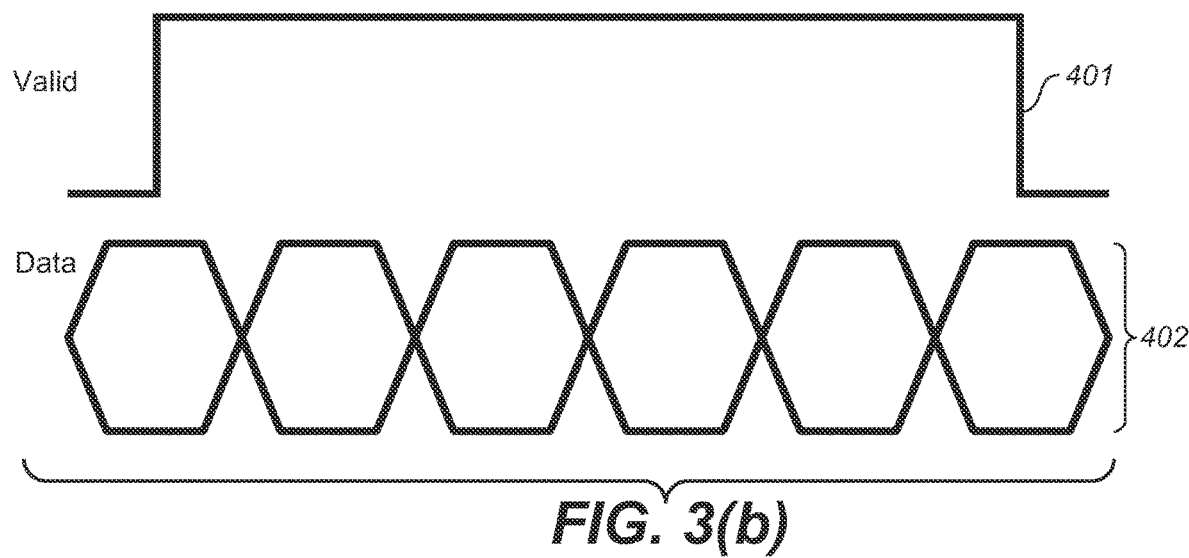
FIG. 3(b) shows an enable signal generated by each operator to signal that its output data stream is ready for processing by the next operator.

Within a configured pipeline, the output data stream of each operator is provided as the input data stream for the next operator. As shown in FIG. 3(b), valid signal 401 is generated by each operator to signal that, when asserted, its output data stream (402) is valid for processing by the next operator. An operator in the pipeline may be configured to generate an interrupt signal upon detecting the falling edge of valid signal 401 to indicate that processing of its input data stream is complete. The interrupt signal may be serviced by control unit 203 or the host CPU. Data into and out of APC 300 are provided over data paths in PLF subunit 202 of FIG. 2.

Some operators may be configured to access an associated memory block (i.e., memory blocks 207-1, 207-2, 207-3 or 207-4). For example, one operator may read data from the associated memory block and writes the data onto its output data stream into the pipeline. One operator may read data from its input data stream in the pipeline and writes the data into the associated memory block. In either case, the address of the memory location is provided to the operator in its input data stream.

Figure 4:
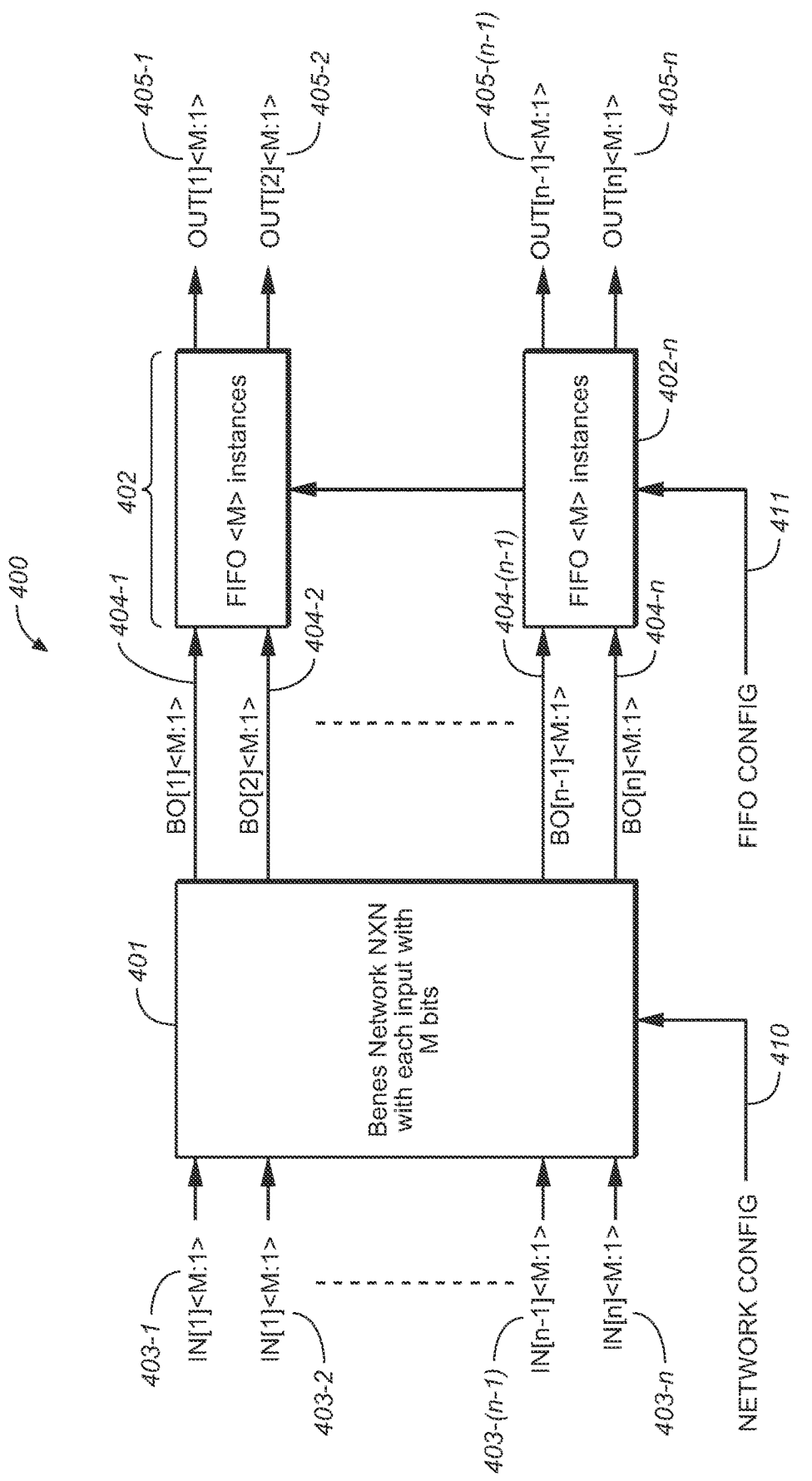
FIG. 4 shows a generalized, representative implementation 400 of any of PLF unit 102-1, 102-2, 102-3, and 102-4 and PLF subunit 202, according to one embodiment of the present invention.

One or more buffer operators may be provided in an APC. A buffer operator may be configured to read or write from a local buffer (e.g., a FIFO buffer). When a congestion occurs at a buffer operator, the buffer operator may assert a pause signal to pause the current pipeline. The pause signal disables all related APCs until the congestion subsides. The buffer operator then resets the pause signal to resume the pipeline operation FIG. 4 shows a generalized, representative implementation 400 of any of PLF unit 102-1, 102-2, 102-3, and 102-4 and PLF subunit 202, according to one embodiment of the present invention. As shown in FIG. 4, PIT implementation 400 includes Bents network 401, which receives n M-bit input data streams 403-1, 403-2, . . . , 403-$n$ and provides n M-bit output data streams 404-1, 404-2, . . . , 404-$n$. Benes network 401 is a non-blocking n×n Benes network that can be configured to allow the input data streams to be mapped and routed to the output data streams stream in any desired permutation programmed into its configuration register. Output data streams 404-1, 404-2, . . . , 404-$n$ are then each provided to a corresponding configurable first-in-first-out (FIFO) register in FIFO registers 402, so that the FIFO output data streams 405-1, 405-2, . . . , 405-$n$ are properly aligned in time for their respective receiving units according to their respective configuration registers. Control buses 410 and 411 represents the configuration signals into the configuration registers of Benes network 401 and FIFO registers 402, respectively.

The above detailed description is provided to illustrate specific embodiments of the present invention and is not intended to be limiting. Numerous modifications and variations within the scope of the invention are possible. The present invention is set forth in the accompanying claims.

I claim:

1. A processor receiving a system input data stream, the processor being included in a system that further comprises a host processor, the processor comprising:
    a first plurality of stream processors and a second plurality of stream processors, each stream processor being configurable by the host processor to receive an input data stream and to provide an output data stream, wherein the input data stream of a selected one of the stream processors comprises the system input data stream, and wherein each stream processor comprises an instruction memory, a plurality of arithmetic logic circuits, and a control processor that executes a configurable sequence of instructions stored in the instruction memory to control operations in the arithmetic logic circuits;
    a first plurality of configurable interconnection circuits, a second plurality of configurable interconnection circuits, and a third plurality of interconnection circuits, wherein (i) each configurable interconnection circuit in the first plurality of configurable interconnection circuits is configurable by both the host processor and one of the control processors in the first plurality of stream processors to route the output data stream of one of the plurality of stream processors as the input data stream of another one of the first plurality of stream processors, (ii) each configurable interconnection circuit in the second plurality of configurable interconnection circuits is configurable by both the host processor and one of the control processors in the second plurality of stream processors to route the output data stream of one of the plurality of stream processors as the input data stream of another one of the second plurality of stream processors; and wherein (iii) each configurable interconnection circuit in the second plurality of configurable interconnection circuits is configurable by the host processor to route one of the output data streams of the first plurality of stream processors, through the first and second pluralities of interconnection circuits, as one of the input data streams of the second plurality of stream processors; and
    a global bus providing access to and being accessible by the stream processors and the configurable interconnection circuits.

2. The processor of claim 1, wherein the host processor provides an enable signal in each stream processor that initiates a computational phase in the stream processor.

3. The processor of claim 2 wherein, when the enable signal of the stream processor is de-asserted, selected circuits in the stream processor are power-gated to conserve power.

4. The processor of claim 1, further comprising an interrupt bus which allows each stream processor to raise an interrupt to the host computer.

5. The processor of claim 4, wherein the plurality of arithmetic logic circuits each receive an input data stream and provide an output data stream, wherein the input data stream of one of the arithmetic logic circuits comprises the input data stream of the stream processor and wherein the output data stream of another one of the arithmetic logic circuits comprises the output data stream of the stream processor; each stream processor further comprises:
    a plurality of configurable interconnection circuits, wherein each configurable interconnection circuit is configurable to route the output data stream of one of the arithmetic logic circuits as the input data stream of another one of the arithmetic logic circuits; and
    a processor bus providing access to or accessible from the arithmetic logic circuits, wherein, during execution of the configurable sequence of instructions, the control processor provides and receives control and configuration signals to and from the arithmetic logic circuits over the processor bus.

6. The processor of claim 5, wherein the control processor processes selected interrupts on the interrupt bus.

7. The processor of claim 5, wherein each stream processor further comprises a plurality of memory circuits each accessible directly from one or more of the arithmetic logic circuits of the stream processor and over the processor bus.

8. The processor of claim 5, wherein each arithmetic logic circuit or configurable interconnection circuit comprises a plurality of configuration registers accessible by the host processor over the global bus or the control processor on the processor bus for storing values of control parameters of the arithmetic logic circuit or configurable interconnection circuit.

9. The processor of claim 1, wherein the instruction memory in each stream processor is accessible over the global bus by the host processor to store the configurable sequence of instructions.

10. The processor of claim 8, further comprising a processor bus multiplexer which is configurable by the host processor to connect a portion of the global bus to the processor bus.

11. The processor of claim 5, wherein each arithmetic logic circuit receives an enable signal from the host processor or the control processor and wherein, when the enable signal is de-asserted, clock signals associated with the arithmetic logic circuit are gated off, thereby suspending operations within the arithmetic logic circuit.

12. The processor of claim 5, wherein each arithmetic logic circuit comprises:
 a plurality of operator circuits each receiving an input data stream and providing an output data stream; and
 a configurable interconnection circuit configurable to route (i) the input data stream of the arithmetic logic circuit as the input data stream of one of the operator circuits; (ii) the output data stream of any of the operator circuits as the input data stream of any other one of the operator circuits, and (iii) the output data stream of one of the operator circuits as the output data stream of one of the arithmetic logic circuit.

13. The processor of claim 12, wherein each operator circuit comprises one or more arithmetic circuits or logic circuits.

14. The processor of claim 13, wherein each arithmetic circuit comprises one or more of: an adder, a multiplier, or a divider.

15. The processor of claim 13, wherein the logic circuits each comprise one or more of shifters, combinational logic circuits, sequential logic circuits, and any combination thereof.

16. The processor of claim 12, wherein each operator circuit provides a valid signal to indicate validity of its output data stream.

17. The processor of claim 12, wherein at least one operator circuit comprises a memory operator.

18. The processor of claim 12, wherein at least one operator circuit comprises a buffer operator.

19. The processor of claim 1, wherein each configurable interconnection circuit comprises a non-blocking network receiving one or more input data streams and provided one or more output data streams.

20. The processor of claim 19, wherein the non-blocking network comprises an N×N Benes network.

21. The processor of claim 19, the configurable interconnection circuit further comprises a plurality of first-in-first-out memory each receiving a selected one of the output data streams of the non-blocking network to provide a delayed output data stream corresponding to the selected output data stream of the non-blocking network delayed by a configurable delay value.

22. The processor of claim 1, wherein the processor serves as a digital baseband circuit that processes in real time digitized samples from a radio frequency (RF) front-end circuit.

23. The processor of claim 22, wherein the input data stream of the processor comprises in-phase and quadrature components of a signal received at an antenna, after signal processing at the RF front-end circuit.

24. The processor of claim 23, wherein the received signal includes navigation signals transmitted from numerous positioning satellites.

* * * * *